(12) United States Patent
Varkey

(10) Patent No.: US 10,005,214 B1
(45) Date of Patent: Jun. 26, 2018

(54) CAP MANUFACTURE METHODS AND APPARATUS

(71) Applicant: Plastek Industries, Inc., Erie, PA (US)

(72) Inventor: Cherian Varkey, Erie, PA (US)

(73) Assignee: Plastek Industries, Inc., Erie, PA (US)

( * ) Notice: Subject to any disclaimer, the term of this patent is extended or adjusted under 35 U.S.C. 154(b) by 266 days.

(21) Appl. No.: 14/790,468

(22) Filed: Jul. 2, 2015

Related U.S. Application Data

(60) Provisional application No. 62/020,768, filed on Jul. 3, 2014.

(51) Int. Cl.
*B29C 45/44* (2006.01)
*B65D 41/02* (2006.01)
*B29L 1/00* (2006.01)

(52) U.S. Cl.
CPC .............. *B29C 45/44* (2013.01); *B65D 41/02* (2013.01); *B29L 2001/00* (2013.01)

(58) Field of Classification Search
CPC .............. B29C 45/2618; B29C 45/262; B29C 45/2622; B29C 33/44; B29C 33/442; B29C 33/444; B29C 33/446; B29C 33/448; B29C 33/46
USPC .................................................. 264/318, 296
See application file for complete search history.

(56) References Cited

U.S. PATENT DOCUMENTS

| | | | |
|---|---|---|---|
| 4,830,234 A | 5/1989 | Odet | |
| 5,234,130 A | 8/1993 | Benioff et al. | |
| 5,566,862 A | 10/1996 | Haffner et al. | |
| 5,603,787 A | 2/1997 | Reid | |
| 5,794,803 A | 8/1998 | Sprick | |
| 5,855,299 A | 1/1999 | Arnold et al. | |
| 5,941,422 A | 8/1999 | Struble | |
| 6,659,310 B1 | 12/2003 | Wolpert | |
| 6,923,341 B2 | 8/2005 | Smith | |
| 7,097,076 B1 | 8/2006 | Giblin et al. | |
| 2002/0001637 A1* | 1/2002 | Taha | B29C 45/262 425/438 |
| 2002/0027121 A1* | 3/2002 | McNary | B29C 45/262 215/252 |
| 2004/0011812 A1 | 1/2004 | Kasting et al. | |
| 2005/0103803 A1 | 5/2005 | Hung et al. | |
| 2009/0101682 A1 | 4/2009 | Szekely et al. | |
| 2010/0043910 A1 | 2/2010 | Szekely et al. | |

FOREIGN PATENT DOCUMENTS

WO 2014/071154 A1 5/2014

OTHER PUBLICATIONS

US Office Action dated Feb. 7, 2017 for U.S. Appl. No. 14/790,435.

\* cited by examiner

*Primary Examiner* — Matthew Daniels
(74) *Attorney, Agent, or Firm* — Bachman & LaPointe, P.C.

(57) ABSTRACT

A method for manufacturing a cap comprises molding the cap in a cavity of a mold, the cavity formed by a plurality of members. The cap is released from the mold, including: a stage wherein there is a relative axial shift of a first member forming a portion of the mold cavity along an inner diameter surface of an upper sidewall and dosing tube relative to a second member forming a portion of the mold cavity along an underside of an upper web.

11 Claims, 20 Drawing Sheets

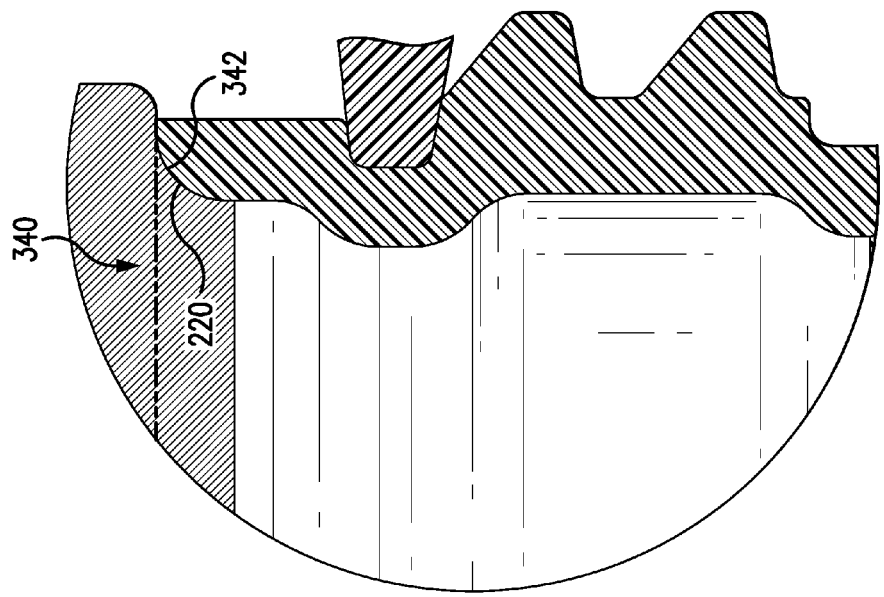
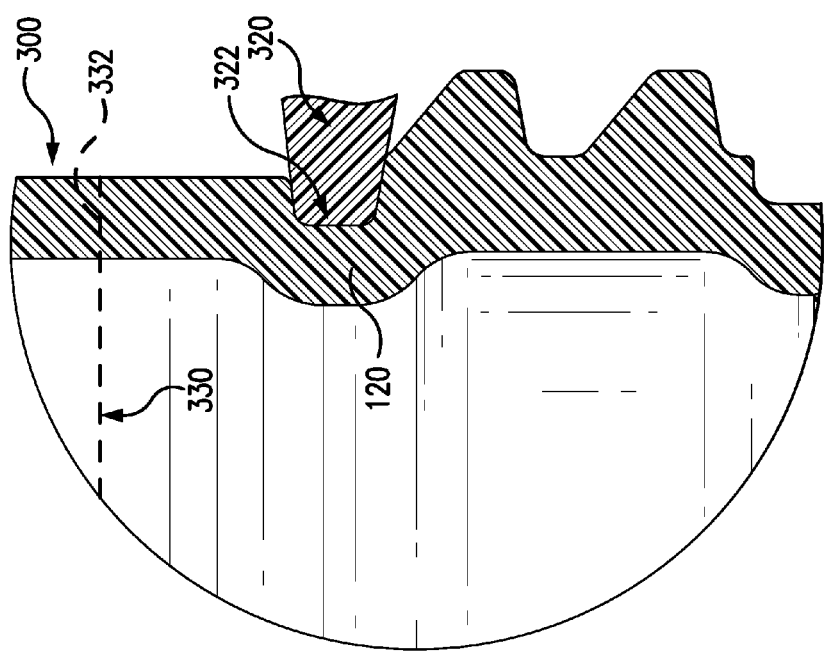
FIG. 13
FIG. 12

CAP MANUFACTURE METHODS AND APPARATUS

CROSS-REFERENCE TO RELATED APPLICATION

Benefit is claimed of U.S. Patent Application No. 62/020,768, filed Jul. 3, 2014, and entitled "Cap Manufacture Methods and Apparatus", the disclosure of which is incorporated by reference herein in its entirety as if set forth at length.

BACKGROUND OF THE INVENTION

The invention relates to containers. More particularly, the invention relates to pour spouts for containers for liquid laundry detergent and the like.

There has been an evolution in the configuration of containers for liquid laundry detergent, fabric softener, and the like. The dominant form of container is a wide mouth bottle having an attached spout with a drain-back trough and aperture (often identified as a drain back spout (DBS) configuration). In a typical group of container configurations and their methods of assembly, a bottle body, spout fitment, and cap are individually molded (e.g., of high density polyethylene (HDPE) for the body, polypropylene for the cap, and low density polypropylene (LDPE) for the spout fitment). Exemplary bottle body molding is via blow molding whereas exemplary spout fitment and cap molding are by injection molding. An exemplary spout fitment includes the spout and a continuation of the spout defining the base and outboard wall of the trough. The fitment further typically includes a flange (e.g., extending outward at an upper end of the outboard extremity of the outboard wall).

The spout fitment may be inserted through a mouth of the bottle body (e.g., so that an outer surface of the outboard trough wall, or another wall outboard thereof, engages the inner surface of the bottle neck). The spout fitment may be secured and sealed to the bottle body such as by spin welding. The bottle may be filled and the cap may be installed. Exemplary caps typically have either an externally threaded skirt for engaging an internally threaded portion of the fitment or an internally threaded skirt for engaging an externally threaded portion of the fitment or bottle body neck. With a typical externally threaded skirt, the cap includes an outwardly projecting flange above the skirt. Upon installation of the cap to the fitment, the flange underside contacts and seals with the fitment flange upper surface to seal the bottle.

Various examples of bottles are shown in U.S. Pat. Nos. 6,923,341, 5,941,422, 5,566,862, and 5,603,787. US Patent Publications 2010/0043910 and 2009/0101682 disclose particular examples of snap-in and snap-over spout fitments.

International Application PCT/US13/68002 discloses additional bottle filling methods.

SUMMARY OF THE INVENTION

One aspect of the invention involves method for manufacturing a cap. The cap has an upper sidewall, an upper web at the upper end of the upper sidewall, a dosing tube, and a flange protruding radially from a junction of the upper sidewall and the dosing tube. The method comprises: molding the cap in a cavity of a mold, the cavity formed by a plurality of members; and releasing the cap from the mold. The releasing includes: a stage wherein there is a relative axial shift of a first member forming a portion of the mold cavity along an inner diameter surface of the upper sidewall and dosing tube relative to a second member forming a portion of the mold cavity along an underside of the upper web.

A further embodiment may additionally and/or alternatively include the cap having a thread and said stage comprises said relative axial shift synchronized with an unscrewing of a thread core A further embodiment may additionally and/or alternatively include the cap having an outer sidewall depending from the flange and said thread is an internal thread on the cap outer sidewall A further embodiment may additionally and/or alternatively include, during said unscrewing, pressurized air being introduced through a passageway in the second member.

A further embodiment may additionally and/or alternatively include the stage being preceded by a disengagement of a cavity plate unit, the cavity plate unit forming portions of the mold cavity along a top of the web and an outer diameter surface of the upper sidewall.

A further embodiment may additionally and/or alternatively include injection molding the cap on the cavity.

Another aspect of the disclosure involves an apparatus for molding a cap. The cap has a cup portion having a sidewall and a base. The apparatus comprises: a plurality of elements positionable to define a mold cavity including a first member forming a portion of the mold cavity along an inner diameter surface of the sidewall and axially shiftable relative to a second member forming a portion of the mold cavity along an inside surface of the base.

A further embodiment may additionally and/or alternatively include the plurality of elements include a thread core mounted for rotation relative to the second member and for axial movement with the second member as a unit.

A further embodiment may additionally and/or alternatively include the first member having a poppet form with a head and a stem. The head is at least partially recessed in a compartment in the second member in a first condition and extendable proud of a rim of the second member in a second condition.

A further embodiment may additionally and/or alternatively include the second member having an air passageway with an outlet to said compartment.

A further embodiment may additionally and/or alternatively include a stripper unit having a portion forming a lower rim of an outer sidewall portion of the cavity.

A further embodiment may additionally and/or alternatively include a second air passageway in the stripper unit.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 12 is a central vertical sectional view of the neck region of the bottle as molded.

FIG. 13 is a central vertical sectional view of the neck region of the bottle during a reaming.

Like reference numbers and designations in the various drawings indicate like elements.

DETAILED DESCRIPTION

Figure 1:
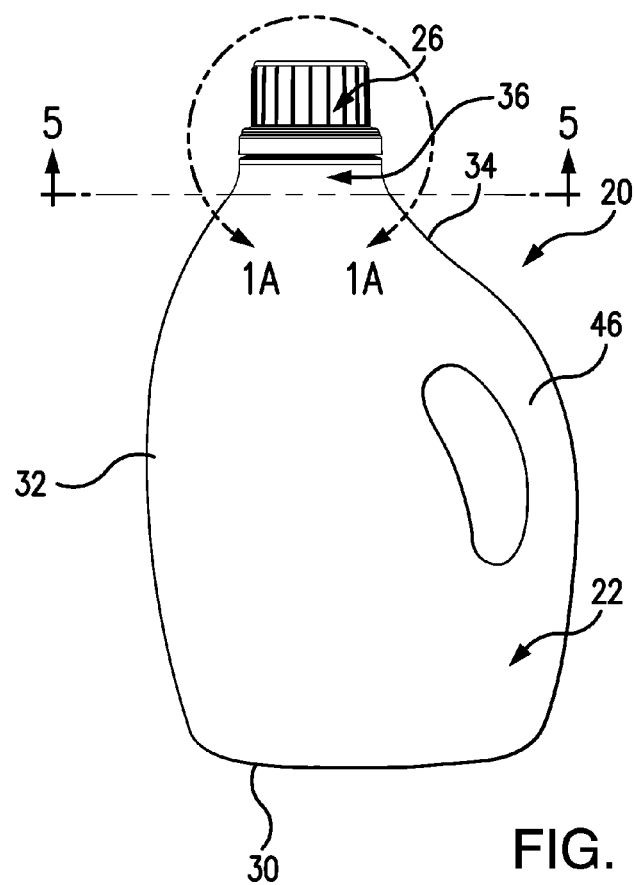
FIG. 1 is a side view of a bottle.
Figure 1A:
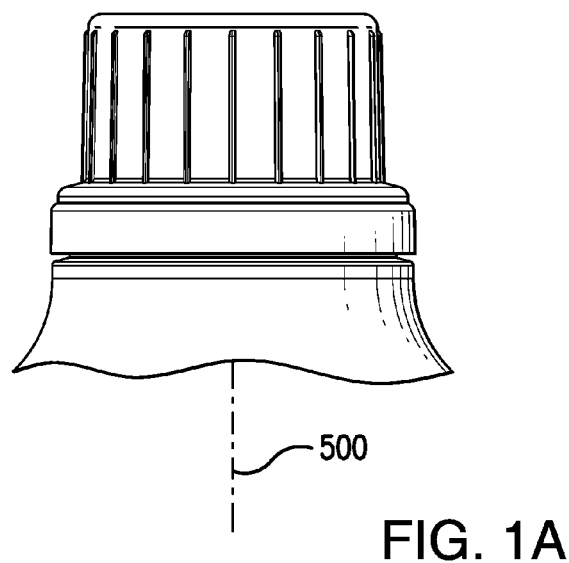
FIG. 1A is an enlarged view of an upper portion of the bottle of FIG. 1.
Figure 2:
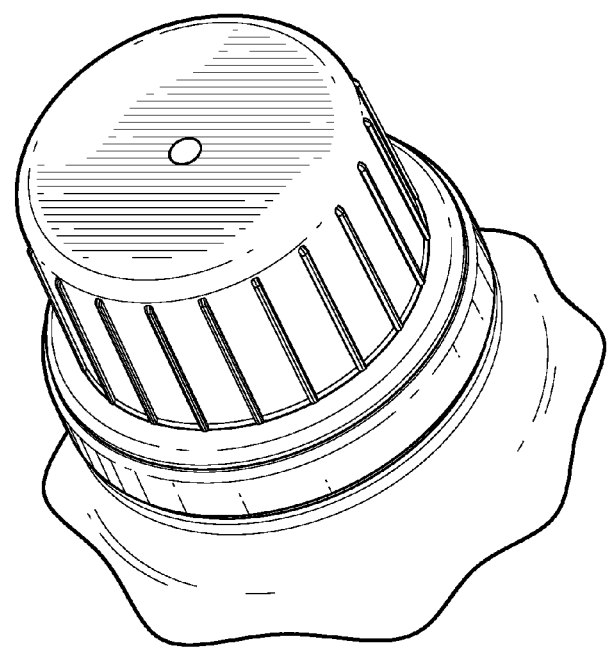
FIG. 2 is a view of an upper portion of the bottle of FIG. 1.

FIG. 1 shows a container 20 comprising the assembly of a bottle body 22, a spout fitment 24 (FIG. 6), and a cap 26 (which may serve as a measuring/dispensing cup). Each may be made as a unitary plastic molding. Exemplary bottle body material is high density polyethylene (HDPE). Exemplary spout fitment and cap material is polypropylene.

Figure 3:
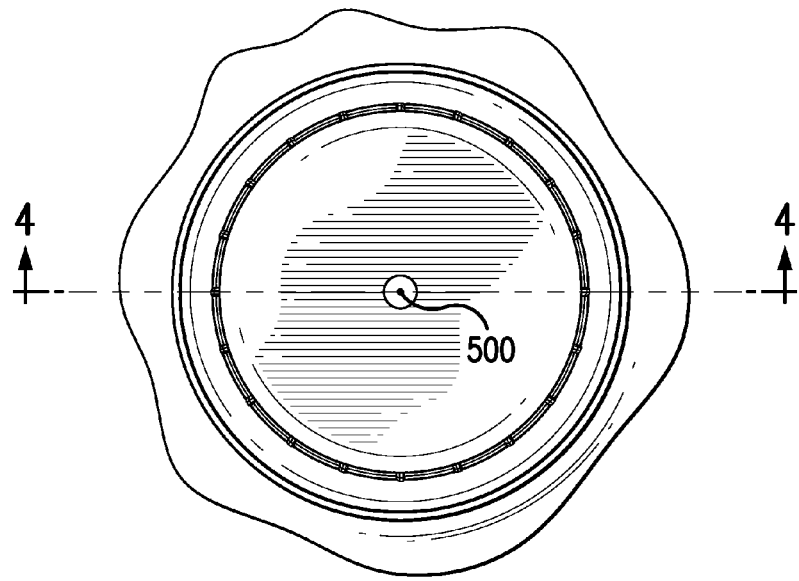
FIG. 3 is a top view of the portion of FIG. 2.

The body 22 comprises a unitary combination of a base 30, a sidewall 32 extending upward from the base, a shoulder 34 at an upper end of the sidewall, and a neck 36 extending upward from the shoulder to a rim 38 (FIG. 4A) and defining an opening 40 having a central longitudinal axis 500. In this example, an axis 500 (FIG. 3) serves as a central longitudinal axis of the spout fitment, cap, and neck of the bottle. In this exemplary embodiment, the axis 500 is vertical when the bottle is resting atop a horizontal surface. Other orientations may be possible. With this exemplary frame of reference, with the bottle in the upright condition, a direction 502 (FIG. 4) is upward parallel to the axis 500 and in opposite direction 504 is downward. Unless otherwise indicated, this frame of reference is used to explain relative position. Clearly, the bottle will be at least partially inverted to pour.

The bottle body has an interior surface 42 and an exterior surface 44. A handle 46 (FIG. 1) may extend from the sidewall and the body interior may extend through the handle The spout fitment 24 includes an inner wall 50 (FIG. 4) and an outer sidewall 52. The outer sidewall and inner wall are joined by a lower wall 53 so as to define a trough 54.

One or more drain-back apertures 58 (FIG. 4) are open to the trough (e.g., through the wall 53). The inner wall 50 forms a spout and has an upper end 60 defining a spout opening 62. The upper end 60 peaks along a forward portion and dips along a rearward portion so that the opening 62 is asymmetric and defines a preferential direction for pouring. The exemplary drainback aperture 58 is formed as a rear end portion of the opening 62.

The cap 26 includes an upper sidewall 70, a transverse web 72 at the upper end of the upper sidewall, and an outwardly projecting flange 74. An inner/lower sidewall 90 depends from a junction of the flange and upper sidewall to a lower rim 92. The inner sidewall 90 forms a dosing tube which combines with the space within the upper sidewall 70 (and web 72) thereabove to define a dose volume containable by the cap. When acting as a cup, the cap web 72 forms a base of the cup and the combined upper sidewall 70 and the dosing tube 90 form a sidewall of the cup. The inner surface of the dosing tube and/or the inner surface of the upper sidewall may bear level indicia such as a scale.

Figure 4:
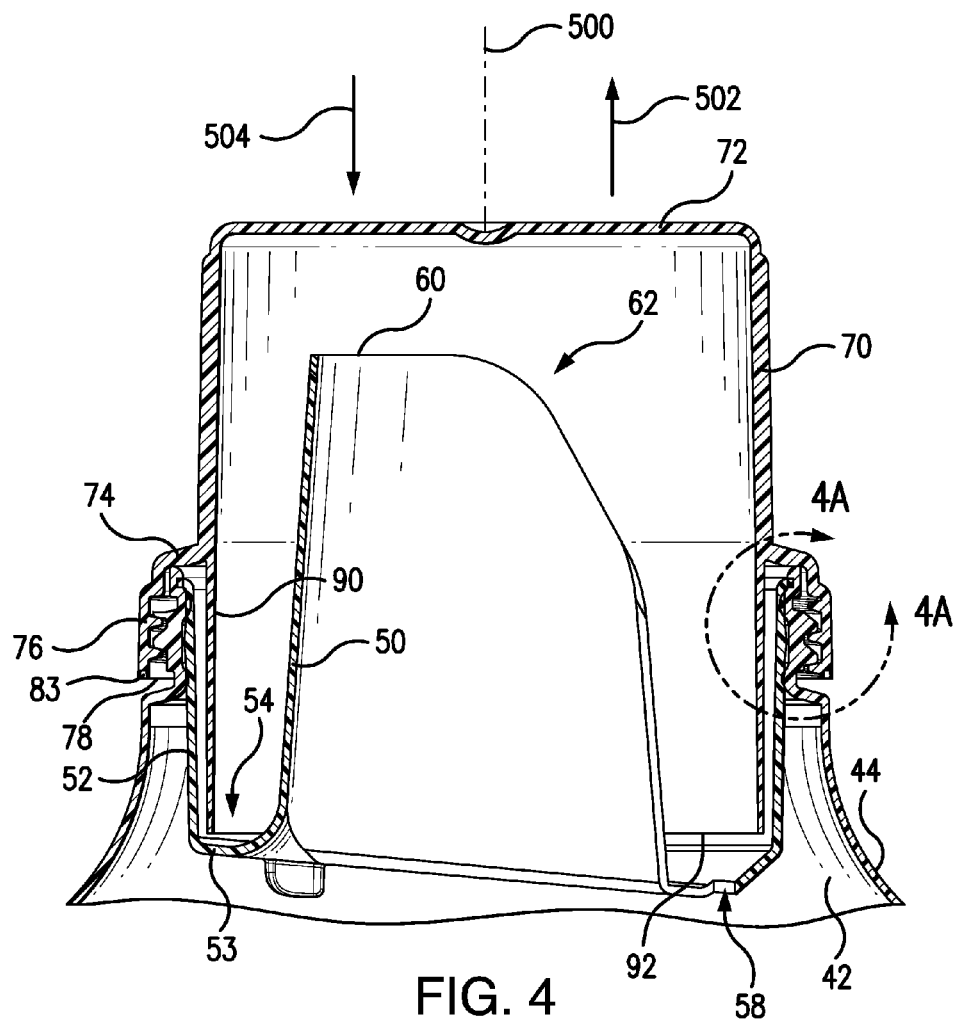
FIG. 4 is a central vertical medial sectional view of the portion of FIG. 3, taken along line 4-4.

An outer sidewall or skirt 76 depends from a periphery of the flange 74 and has a lower rim 78. An inner diameter (ID) surface 80 (FIG. 4A) of the sidewall 76 bears an internal thread 82. The lower rim 78 may have recesses/compartments 83 (FIG. 4A) called "unscrewing dogs" which allow for rotational retention when a thread molding core is unscrewed from a freshly molded cap. FIG. 4 shows the body neck as bearing an external thread 84 mounted to the internal thread 82.

Figure 4A:
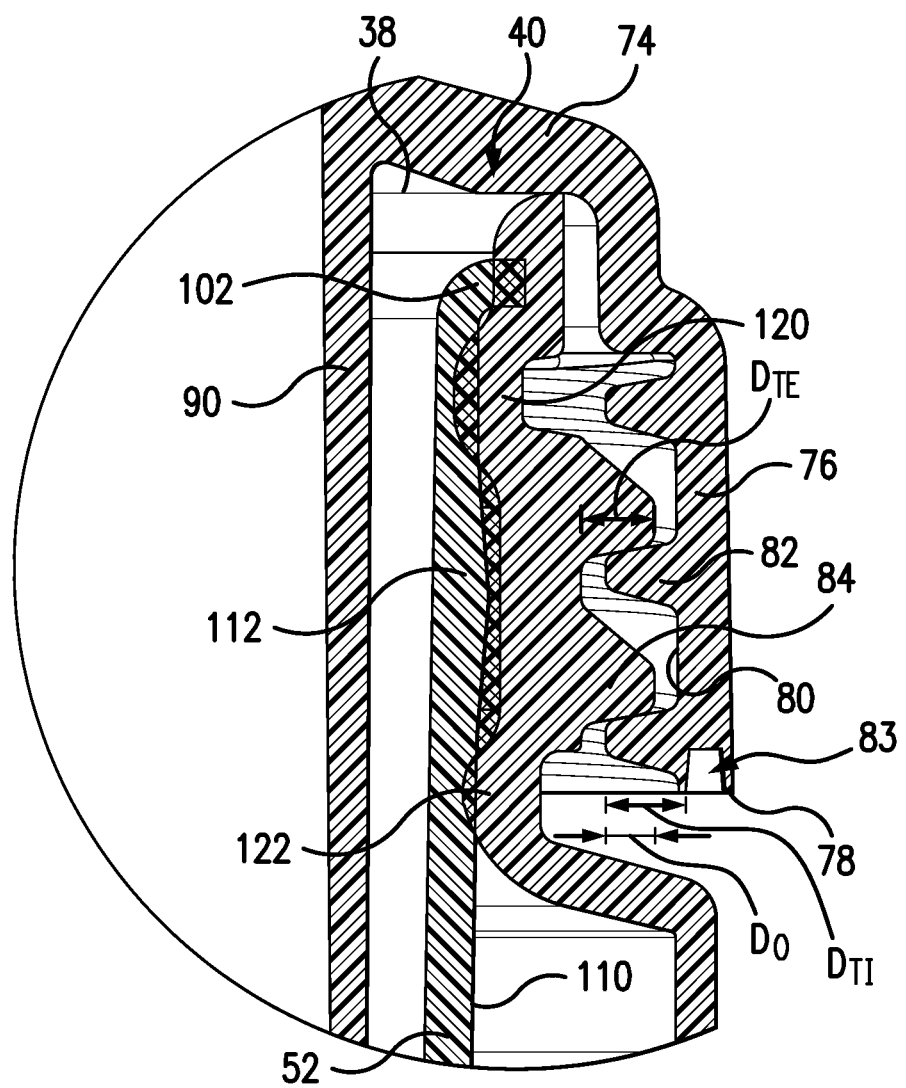
FIG. 4A is an enlarged view of a rear portion of a rim area.
Figure 5:
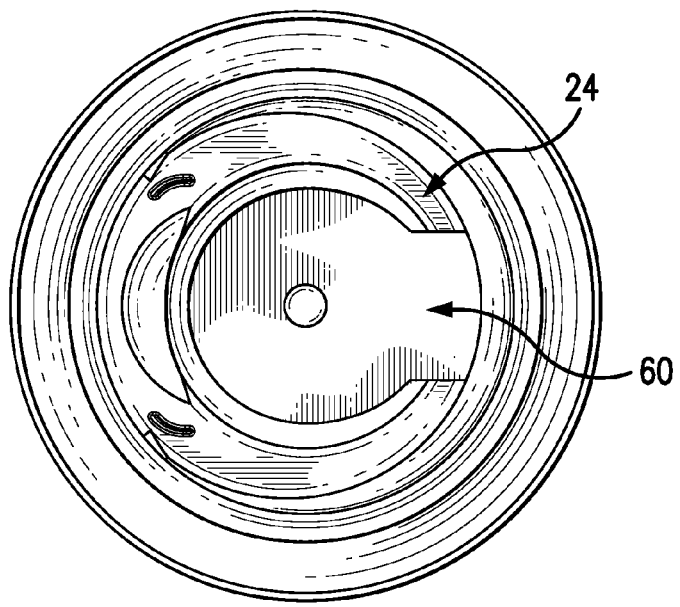
FIG. 5 is a upward horizontal sectional view of the bottle of FIG. 1, taken along line 5-5.
Figure 10:
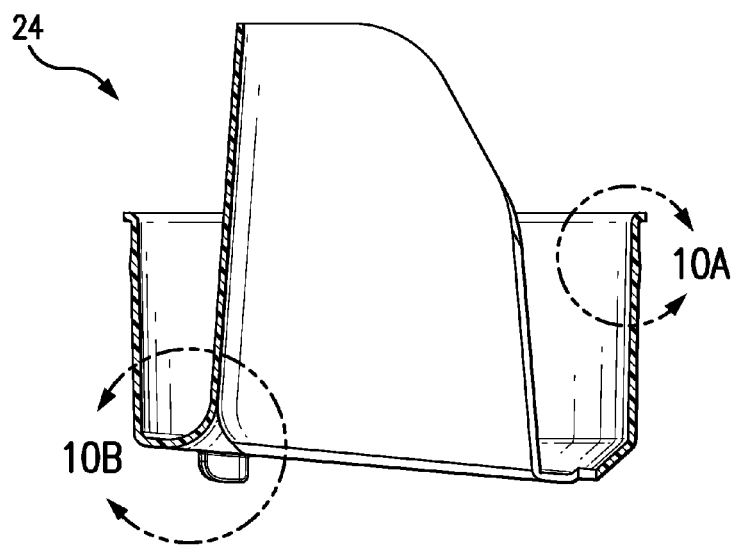
FIG. 10 is a central vertical medial sectional view of the spout fitment.
Figures 10A, 10B:
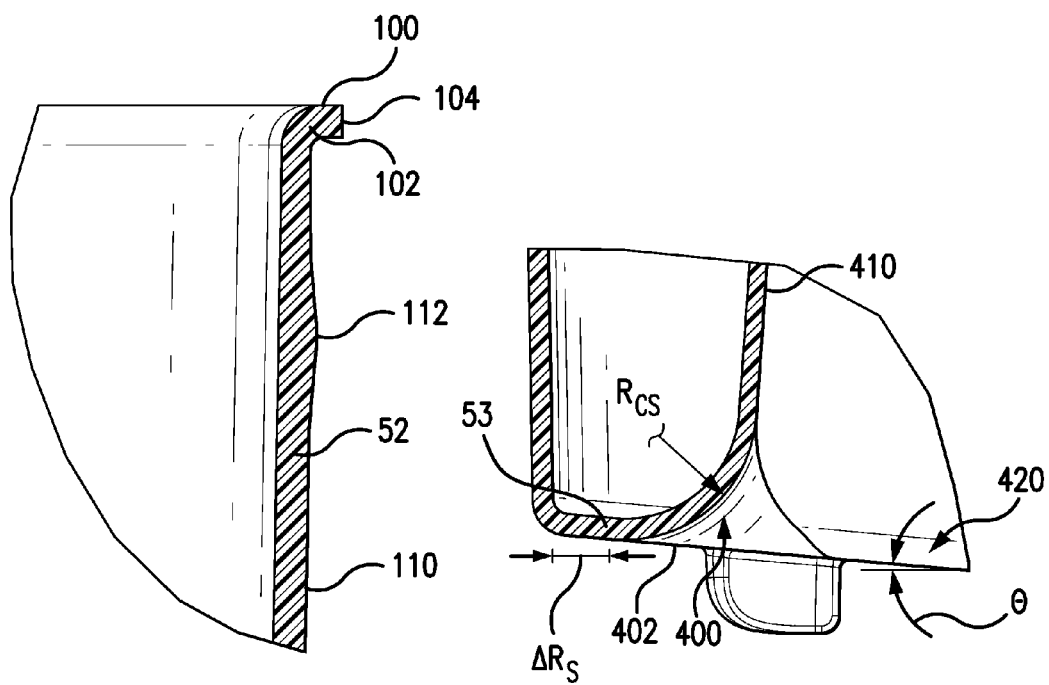
FIG. 10A is an enlarged view of a rim portion of the spout fitment of FIG. 10.
FIG. 10B is an enlarged view of a lower front portion of the spout fitment of FIG. 10.

FIG. 4A shows a condition wherein the spout fitment is installed to the bottle body and the cap screwed down into sealing engagement with the bottle body. Exemplary installation of the spout fitment is via a snap-in engagement. FIG. 4A shows interfitting of engagement features of the spout fitment and bottle body. As noted above, these are shown interfering due to artifacts of computer modeling of the components in relaxed as-molded conditions rather than deformed assembled conditions. FIG. 10A shows the spout fitment outer sidewall 52 extending to an upper rim 100 and having a radially projecting flange 102 at the rim 100 having a radial rim 104. Below the flange 102, the outer diameter (OD) 110 surface of the outer sidewall 52 has a radial protrusion 112. The exemplary radial protrusion is formed by a local thickening of the sidewall 52.

The flange 102 and protrusion 112 may form features for mounting the spout fitment to the bottle body. To cooperate with these spout fitment features, the bottle body neck along its inner diameter (ID) or interior surface 42 has exemplary upper and lower radially-inward annular protrusions 120 and 122 (FIG. 11A) defining a channel 124 therebetween. In the assembled/installed condition, the underside of the flange 102 (FIG. 10A) abuts an upper surface portion 126 (FIG. 11A) of the protrusion 120 to resist further insertion of the spout fitment. This exemplary installed/inserted condition involves the rim 100 (FIG. 10A) of the spout fitment being subflush to the rim 38 (FIG. 11A) of the bottle body. The channel 124 receives the protrusion 112. One or both of the protrusions 120, 122 may be in sealing contact with the OD surface 110. With the spout fitment in a fully seated position, the protrusion 112 is approximately centered between the protrusions 120, 122 and a tapering of the surface 100 away from the protrusions helps keep the protrusions aligned/seated in this position to prevent extraction. This seating plus the interaction of the spout fitment flange with the upper surface of the protrusion 120 helps resist further insertion below the seated position. FIG. 4A shows an as-molded radial interference between the flange and neck as an exemplary 0.050 inch (1.3 mm).

Figure 9:
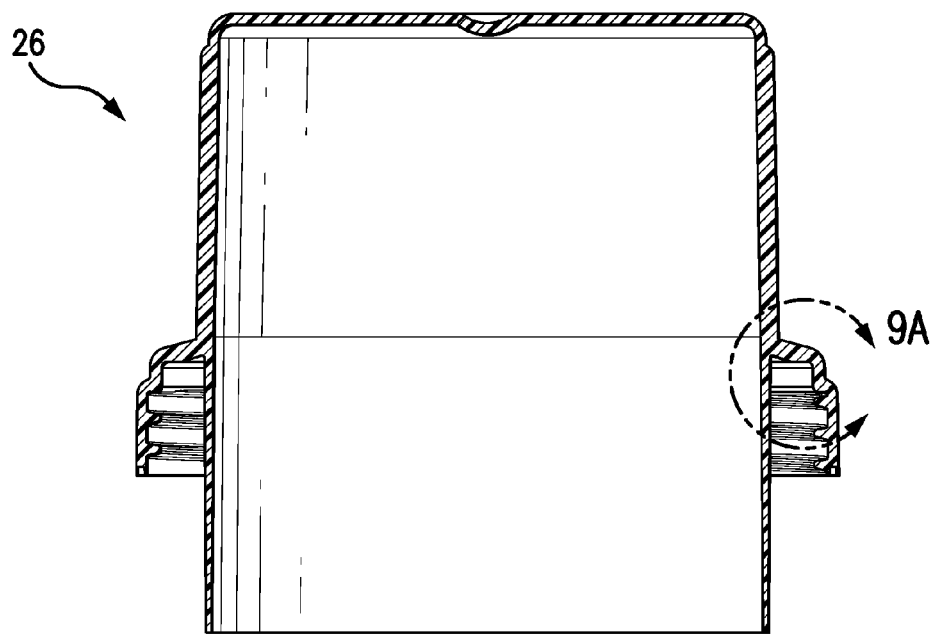
FIG. 9 is a central vertical sectional view of a cap of the bottle of FIG. 1.
Figure 9A:
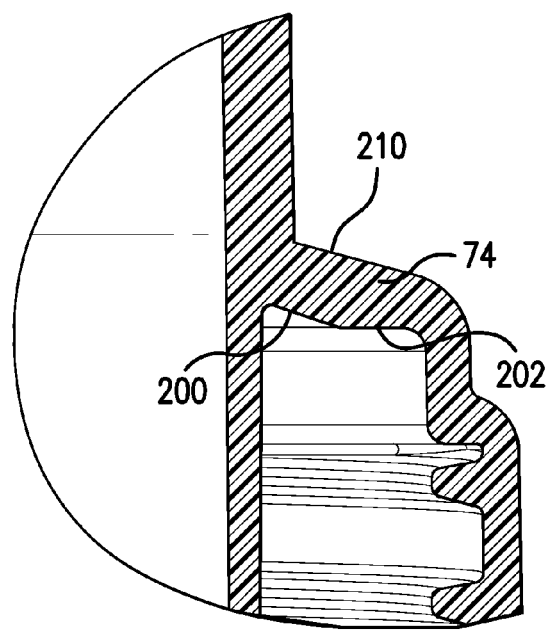
FIG. 9A is an enlarged view of a flange region of the cap of FIG. 9.

FIG. 9A further shows an underside of the flange 74 having an inboard portion 200 and an outboard portion 202. The exemplary outboard portion 202 is essentially radial whereas the exemplary inboard portion 200 tapers downwardly and radially outwardly. This combination along with a generally continuous downward and outward taper of an upper surface 210 of the flange causes the flange to have a relatively thickened radially intermediate portion. As is discussed further below, the outboard portion 202 is what comes into sealing engagement with the bottle body when the cap is tightened down. The slight angling of the surface 210 (e.g., 15° off radial over a majority of its radial span, more broadly 10-20° or 12-18°) adds strength to resist upward deformation of the flange 74 when the underside portion 202 is engaged to the bottle rim. The upward angling (when viewed radially inward) of surface portion 200 (e.g., 20° off radial over a majority of its radial span, more broadly 10-25° or 15-25°; or it may be an exemplary 2-10° more than the surface 210, more particularly 3-8°) serves to reduce material (to save on cost and to allow faster cooling). Exemplary radial span of the portion 202 is selected to be sufficient to engage the rim allowing for eccentricity and subsequent deformation (e.g., 30-60%, more particularly 35-55% of the span of the flange underside with the surface portion 200 being 23-60% or 35-55% and transitions accounting for any remainder). Similarly, the geometry helps reduce plastic deformation of the flange during mold ejection (when a withdrawing core tends to pull down on the dosing tube) in addition to reducing elastic deformation in use.

Figure 11:
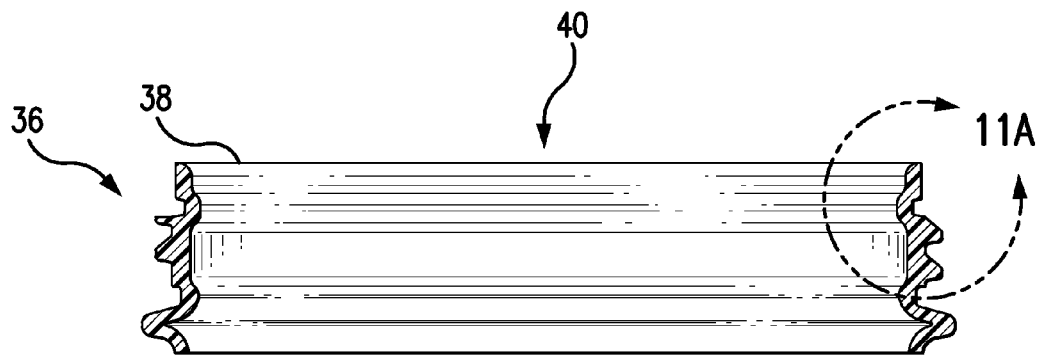
FIG. 11 is a central vertical sectional view of a neck region of the bottle body.
Figure 11A:
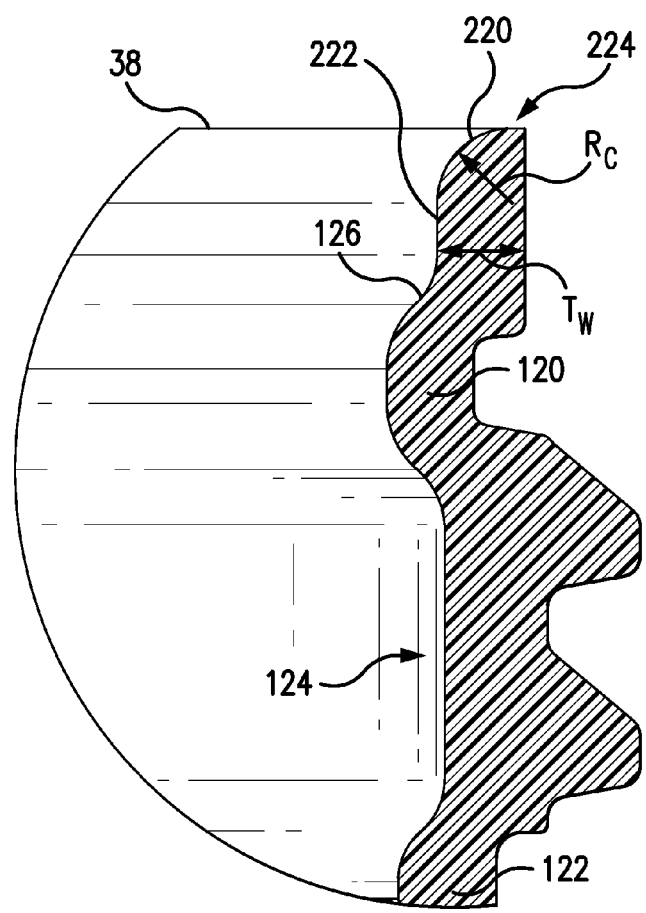
FIG. 11A is an enlarged view of a mouth region of the neck of FIG. 11.

To engage the cap flange underside, FIG. 11A shows a cross-section of the bottle body at the mouth as having an arc portion 220 (e.g., a quarter-round) extending from a portion of the interior surface 222 above the protrusion 120 to the rim 38. FIG. 11A shows an exemplary wall thickness $T_W$ at a base of the arc portion. Exemplary $T_W$ is approximately is 0.045 inch (1.4 mm), more broadly 0.90 mm to 1.5 mm or 1.0 mm to 1.3 mm. A radius of curvature $R_C$ of the vertical cross-section along the arc portion is an exemplary 0.035 inch (0.89 mm) more broadly, 0.5 mm to 2.0 mm or 0.7 mm to 1.4 mm. This leaves a very slight flat intact rim portion 224 outboard. With the exemplary numbers, a radial span of this flat is 0.01 inch 0.25 mm), more broadly 0.00 mm to 0.50 mm. More broadly, $R_C$ is 0.5-1.0 times $T_W$. $R_C$ may have a value in this range over an arc of at least 30°, more broadly, at least 60°, with the exemplary full quarter-round being approximately 90°.

In an exemplary method of manufacture and assembly, the cap and spout are separately molded (e.g., injection molded). The body is initially molded (e.g., blow molded or roto molded). This body molding leaves a precise exterior surface where the plastic engages the mold and leaves a less precise interior surface. The body molding also leaves a region of excess material 300 (FIG. 12) of the neck protruding beyond where the ultimate mouth/rim will fall. For example, this may be excess material from the original parison used in a blow molding process.

After ejection from the mold, the neck is engaged by a clamp 320 (e.g., a segmented annular clamp protruding into a channel or groove 322 on the neck exterior surface associated with the protrusion 120). The excess material (or at least a portion thereof) may then be removed such as via cutting. Exemplary cutting is a guillotine-like cleaving along a cut line 330 which leaves a precursor 332 of the body rim. A reamer 340 (FIG. 13) is then inserted and rotated about its central axis (coincident with the neck central vertical axis) to ream the bottle mouth. This knocks off the inboard corner of the neck cross-section to cut a precise profile of the quarter-round or other convex arc of the arc portion 220. The cutting and reaming may be performed with the clamp and any associated fixture moving in a manufacture line from a cutting station to a reaming station. For example, the clamps may be mounted on a carousel rotating through various stations.

Several factors may cause ultimate unevenness of the bottle rim despite the reaming. First, the clamping action may introduce a slight deformation to the neck. Upon release of the clamping, the rim may take a slight wave shape. Also, there may be asymmetries from thermal contraction. Normally, such a wave will create sealing difficulties with a cap. The high spots would resist further tightening of the cap, leaving potential gaps adjacent the low spots permitting leakage. By providing the convexity of the convex arc portion 220, engagement between the convex arc portion 220 and the flange underside outboard portion 202 will cause initial high spots to cam radially outward and slightly downward and eventually bring the low spots into sealing contact with the portion 202.

For example, assume the rim has two diametrically opposite high spots and two diametrically opposite low spots offset from the high spots by 90°. If the mouth initially has perfect circularity, the flange engagement will cause the mouth to deform slightly into an elliptical planform/footprint with the longer dimension extending between the high spots and the shorter dimension extending between the low spots.

To provide for such engagement, the bottle and cap threads may be provided with unusually high thread depths $D_{TE}$ and $D_{TT}$. The threads may also have a relatively large (large in proportion to overall neck diameter when compared with state-of-the-art) radial overlap depth Do thus providing increased thread strength to allow the threads to bear the load of deforming the bottle neck to seal against the cap. However, a relaxed gap between the tips of each thread and the receiving trough of the mating member may also be greater than in a baseline thread. This gap can further facilitate relative radial shifting due to the deformation associated with the camming interaction The gap can also accommodate greater variations in as-molded bottle neck size or eccentricity. Exemplary thread depths are 0.055 inch (1.40 mm) contrasted with slightly smaller 0.047 inch (1.19 mm) threads used on baseline bottles of similar neck size. Exemplary overlap is 0.020 inch (0.51 mm), leaving gaps of 0.035 inch (0.90 mm).

An exemplary assembly involves assembling the spouts to the bottles with the spouts cold (e.g., at room temperature) and the bottle bodies at elevated temperature (e.g., in excess of 100° F. (38° C.) or in excess of 120° F. (49° C.) immediately after the molding/cutting/reaming process). This means the bottle neck is relatively thermally expanded and relatively soft so that it can easily receive the spout and then continue to contract and conform to/interlock with the spout.

Various implementations may have one or more of various advantages. One group of advantages relate to eliminating the cost of a gasket/liner between the cap and the bottle rim. It may also avoid the need for more complicated spout fitment arrangements to provide good sealing (and thereby resulting in labor and/or material cost savings).

Figure 6:
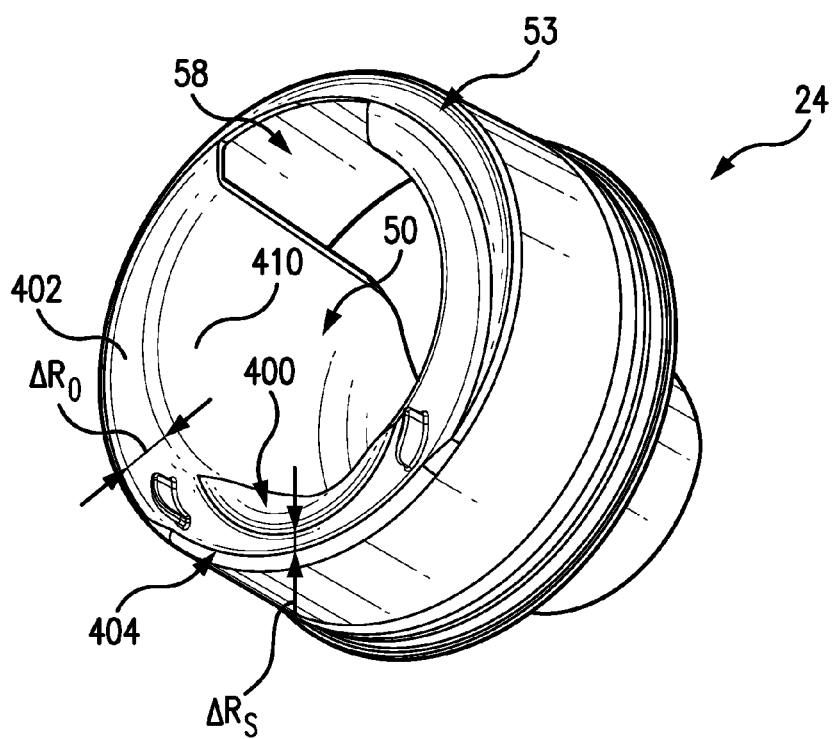
FIG. 6 is a bottom perspective view of a spout fitment of the bottle of FIG. 1.
Figure 7:
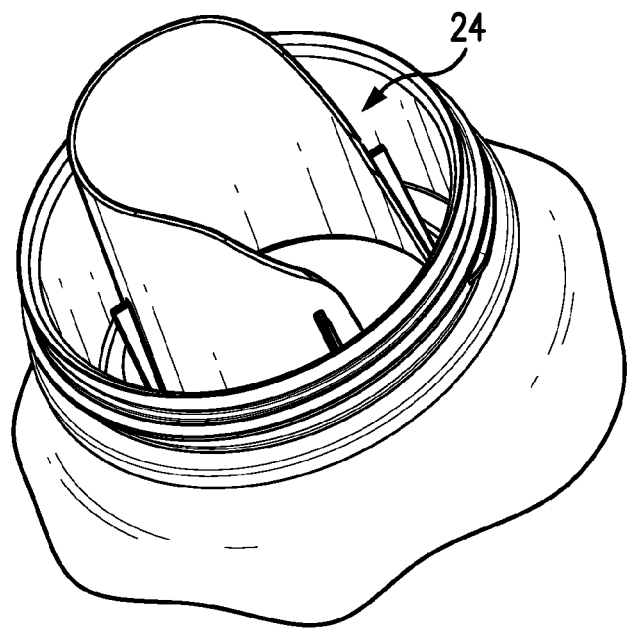
FIG. 7 is a top perspective view of the spout fitment seated in a body of the bottle of FIG. 1.
Figure 8:
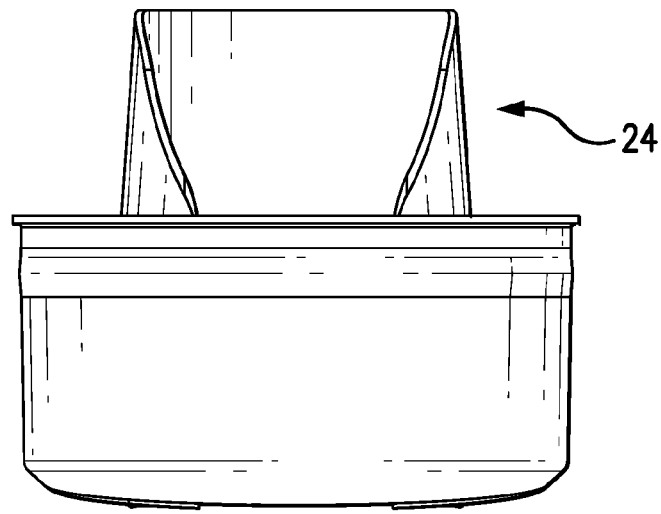
FIG. 8 is a rear view of the seated spout fitment.

Another feature which may be implemented independently of the other features is a pouring aid feature 400 shown in FIG. 6. The feature 400 is formed as a recess or a scallop in the underside (surface) 402 of the lower wall 53. The exemplary scallop 400 extends from just radially inboard of an outer periphery 404 of the surface 402 and merges with the interior/inboard surface 410 of the inner wall 50. The exemplary recess is adjacent the front end of the spout fitment diametrically opposite the drain back aperture 58. In pouring, as the bottle is forwardly declined from its upright position, the feature 400 provides an eased ramping transition to the flow rather than a more abrupt encounter of the flow with the surface 402 in the absence of such a feature. This may provide a smoother, more controllable pour.

The exemplary lower wall 53 underside surface 402 has an essentially flat main portion off horizontal by an angle θ (FIG. 10B). Exemplary θ is about 2-15° or 4-10°, more particularly, about 4-5°. Adjacent the scallop 400, a radial span $\Delta R_S$ is less than half of what the intact radial span $\Delta R_O$ is adjacent the scallop and less than half of what such radial span would be in the absence of the scallop at the scallop location. Exemplary $\Delta R_S$ is 0.065 inch (1.7 mm), more broadly 1.4-3.0 mm or 1.4-2.5 mm, which is selected to prevent damming of material at the front end of the trough when the bottle is reuprighted and product drains back.

FIG. 10B further shows an approximate radius of curvature of the interior surface at the scallop as $R_{CS}$. Exemplary $R_{CS}$ provides a smooth transition between the underside and the essentially frustoconical portion of the interior surface 410 thereabove. $R_{CS}$ may be substantially greater than a radius of curvature of a much tighter transition 420 away from the scallop and may occur over a vertical span several times larger than the vertical span of the transition 420 (e.g., 2-10 times or an exemplary 3-8 times). Exemplary $R_{CS}$ at the front of the spout is 0.330 inch (8.4 mm), more broadly 5-20 mm over an arc length of an exemplary 0.52 inch (13 mm), more broadly 8-20 mm or 45-95° of arc in the vertical cross section as viewed. An exemplary circumferential span of the relief is at least about 50°, more particularly about 70° or 60-100°.

Figure 14:
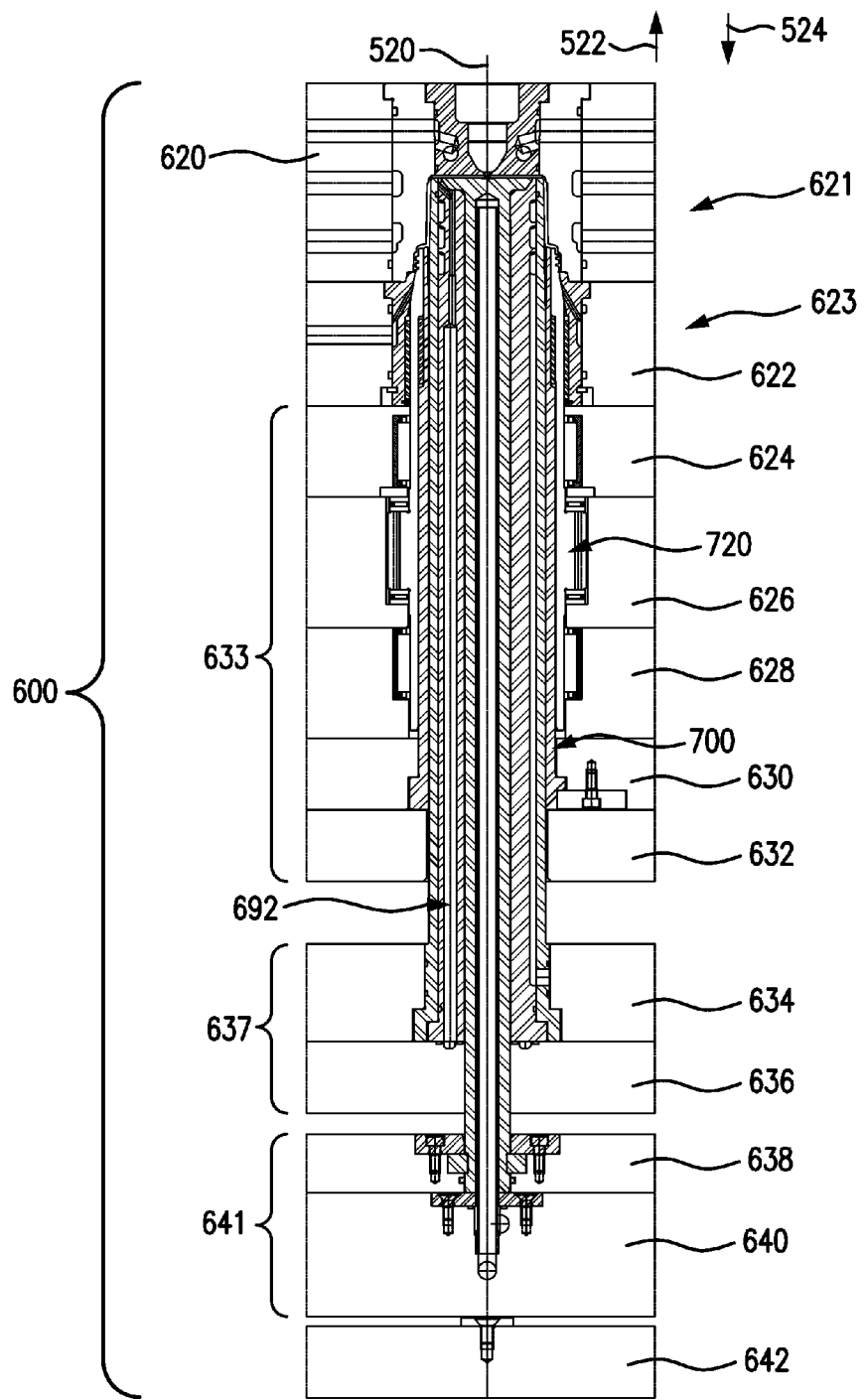
FIG. 14 is a sectional view of a mold assembly along a central axis of a mold cavity in a closed/molding condition.

FIG. 14 shows a mold assembly 600 for molding a cap. The assembly has a longitudinal axis 520. The axis 520 is central along one mold cavity of the assembly. A pair of parallel opposite axial directions 522 and 524 is shown. For purposes of exposition, 520 will be assumed as a vertical axis and 522 an upward direction and 524 a downward direction. In practice, these may take other orientations such as a horizontal orientation of the axis 520. The mold is schematically shown as a section of a larger mold. For example, the exemplary mold may have an array of mold cavities for simultaneously molding a plurality of caps. The exemplary mold comprises a plurality of mold plates which may be drawn toward or away from each other parallel to the axis 520 via conventional actuation mechanisms (not shown). From top-to-bottom the plates comprise a cavity plate 620; a stripper plate 622; an upper bearing plate 624; a core gear plate 626; a lower bearing plate 628; a core plate 630 (stationary outer core retainer plate); a support plate 632 (stationary outer core backup plate); a top ejector retaining plate 634; a top ejector plate 636; a bottom ejector retaining plate 638; a bottom ejector plate 640; and a bottom clamp plate 642.

In operation, various of the plates move together as units axially relative to other plates or groups. In this example, the cavity plate (including its inserts) forms its own cavity plate unit 621. The stripper plate (including a stripper 730 (stripper insert)) forms its own unit 623. The plates 624, 628, 630, and 632 (and cores 700 & 720) form a third unit 633. The plates 634 and 636 and an inner core assembly 680 form a fourth unit 637. The plates 638 and 640 and ejector core 670 form a fifth unit 641. The bottom clamp plate forms a sixth unit.

Figure 14A:
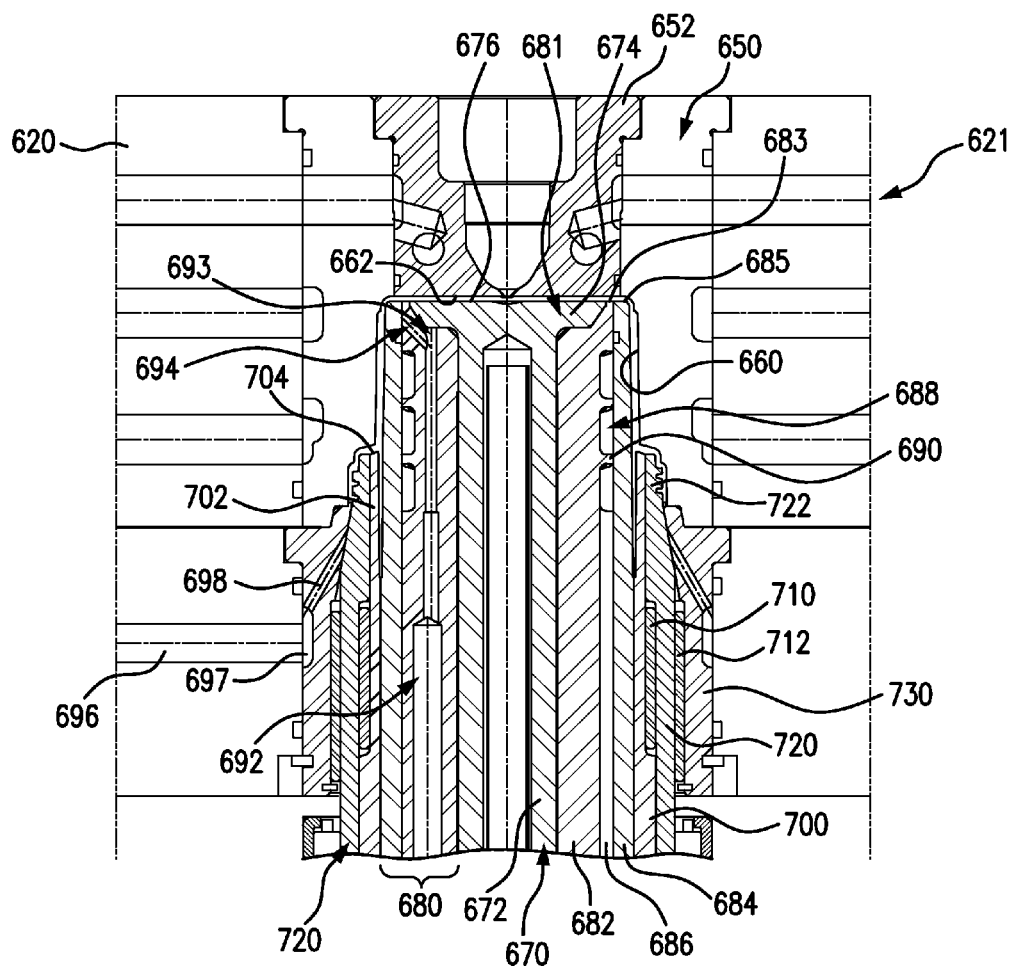
FIG. 14A is an enlarged view of a cavity end of the mold assembly.

FIG. 14A shows the cavity plate 620 as carrying a cavity insert comprising an outer cavity member 650 and an inner cavity member 652. The outer cavity member is accommodated in a compartment in the plate 620 and the inner cavity member is accommodated in a compartment in the outer cavity member. The outer cavity member comprises a surface 660 for forming mold cavity portion for molding an outer surface of the cap sidewall. The inner cavity member 652 has a lower face or surface 662 forming a mold cavity portion for molding a central portion of the cap web.

The remaining plates carry a series of concentric inserts or cores. These include a center ejector core 670 having a shaft 672 extending upward to a poppet-like head 674. The head has an upper/distal surface 676 positioned to form a portion of the mold cavity to mold a central portion of the cap web underside or interior surface along the web.

An inner core assembly 680 concentrically receives/accommodates the center ejector core 670, with a compartment 681 receiving the head 674. The core 680 comprises an inner member 682 and an outer member 684. Upper rims 683, 685 of these combine to form an upper rim of the core assembly surrounding the compartment 681 and positioned to form a portion of the cavity surface for molding a periphery of the cap web inner surface/underside.

The outer member and inner member cooperate to define a water jacket for cooling. FIG. 14A shows a passageway 686 extending axially between the inner member and the outer member. The passageway communicates with a water jacket 688 formed by a thread-like spiral 690 protruding from the exterior of the inner member to mate with the interior of the outer member in a region adjacent the mold cavity. The passageway 686 forms one of an inlet passageway and an outlet passageway and there may be a complementary passageway providing the opposite function (see baseline of FIG. 19 below).

The core 680 also has an air channel 692 having an inlet (not shown) in communication with an air source (not shown). As is discussed further below, the air channel is used in part ejection. FIG. 14A shows downstream end portions 693 and 694 of the air channel near the portion of the cavity that molds the underside of the web of the cap. The exemplary portion 693 is a terminal end portion of a stepped bore and has an outlet along an underside of the head 674. The exemplary portion 694 is a branch bore extending from the stepped bore and has an outlet along a circumferential interface between the core members 682 and 684 at the rims 683, 685.

FIG. 14A also shows a second air channel 696 which extends to a plenum 697 in the stripper core. Outlet channels 698 from the plenum extend to meet the rotating core and ultimately serve to introduce air to a space between the threaded sidewall of the cap and the dosing tube.

The inner core 680 is received within a stationary outer core 700. The outer core 700 is mounted to the core plate 630 to move (or remain stationary) with the aforementioned second unit 633. The upper end portion 702 of the stationary outer core 700 falls along the mold cavity with an upper rim 704 molding an inboard portion (e.g., 200 of FIG. 9A) of an underside of the cap flange and an inner surface molding an outer surface of the dosing tube. Thus, the mold cavity portion corresponding to the dosing tube may be formed in a pocket between the members 680 and 700.

The stationary outer core is received within a rotating thread core 720. FIG. 14A shows an inner bushing 710 and an outer bushing 712 respectively guiding rotation of the thread core relative to the stationary outer core 700 and the stripper 730 (discussed below). The thread core has an upper portion 722 having an external (outer diameter) profile configured to mold the cap threads. Thus, in this example, the rim of the outer core 702 is angled to mold the portion 200 (FIG. 9A) and the rim of the thread core is radial to mold the portion 202.

Figure 14B:
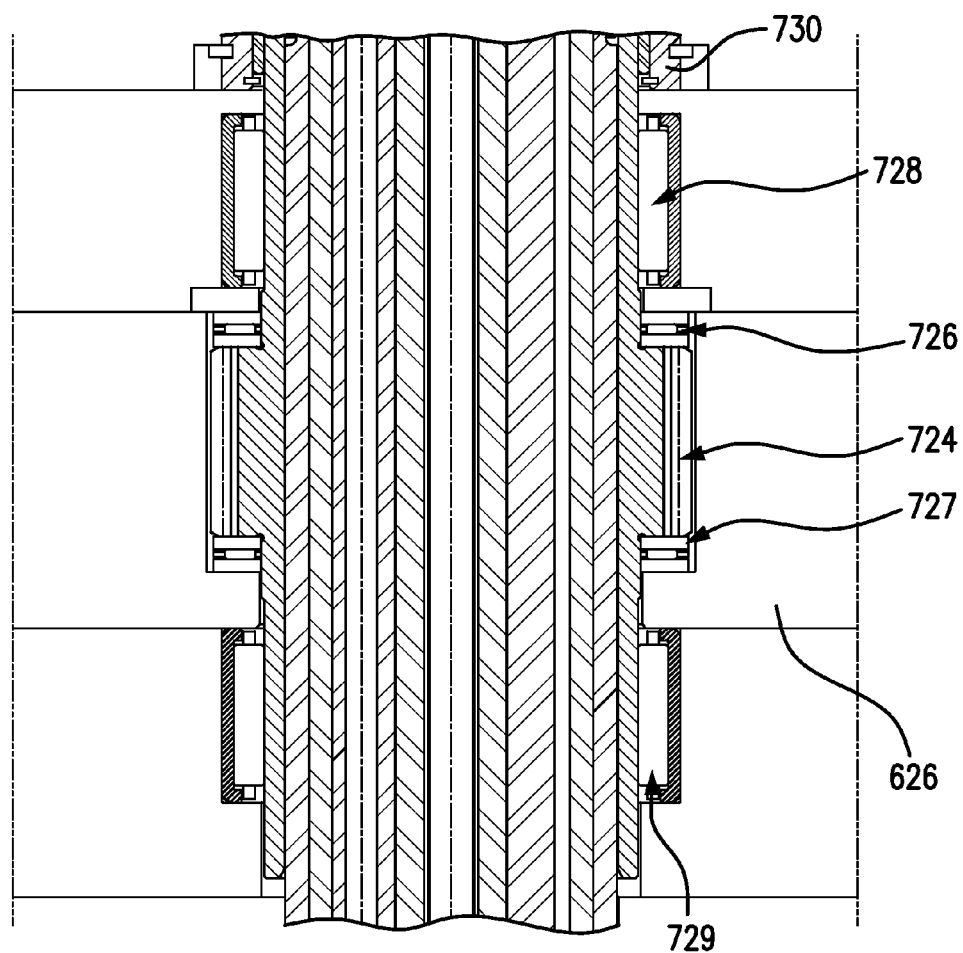
FIG. 14B is an enlarged view of first intermediate region of the mold assembly.
Figure 14C:
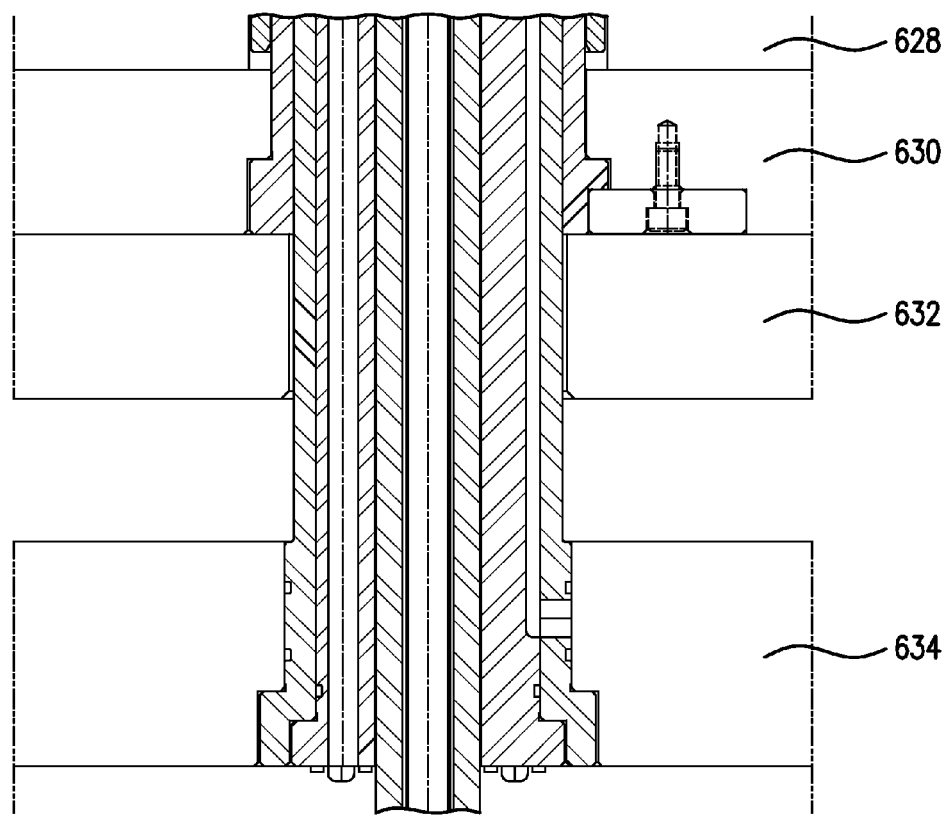
FIG. 14C is an enlarged view of second intermediate region of the mold assembly.

In order to disengage from the molded cap, the core 720 is made rotatable about the axis 520 relative to the remaining portion of the mold sections that define the mold cavity. The core 720 is carried by the core gear plate 626 (FIG. 14B). The core 720 has a central external gear portion 724 captured in a compartment in the core gear plate 626 (e.g., supported by axial bearings 726 and 727 and radial bearings 728 and 729 to permit the rotation). A rack (not shown) extends through the core gear plate engaging the gear portions 724 of respective mold cavities to drive in unison rotation of the cores 720 about their respective axes 520.

The core 720 is mated to/within a stripper core 730. As is discussed further below, the stripper core 730 serves to help eject/strip the molded cap. As is discussed below, the mating allows a relative rotation and translation to unscrew the core 720 and then further extend the stripper core 730 to eject the molding. The stripper core forms a portion of the mold cavity that molds the outer sidewall rim and may thus include unscrewing dog projections complementary to the unscrewing dog recesses 83.

Figure 15:
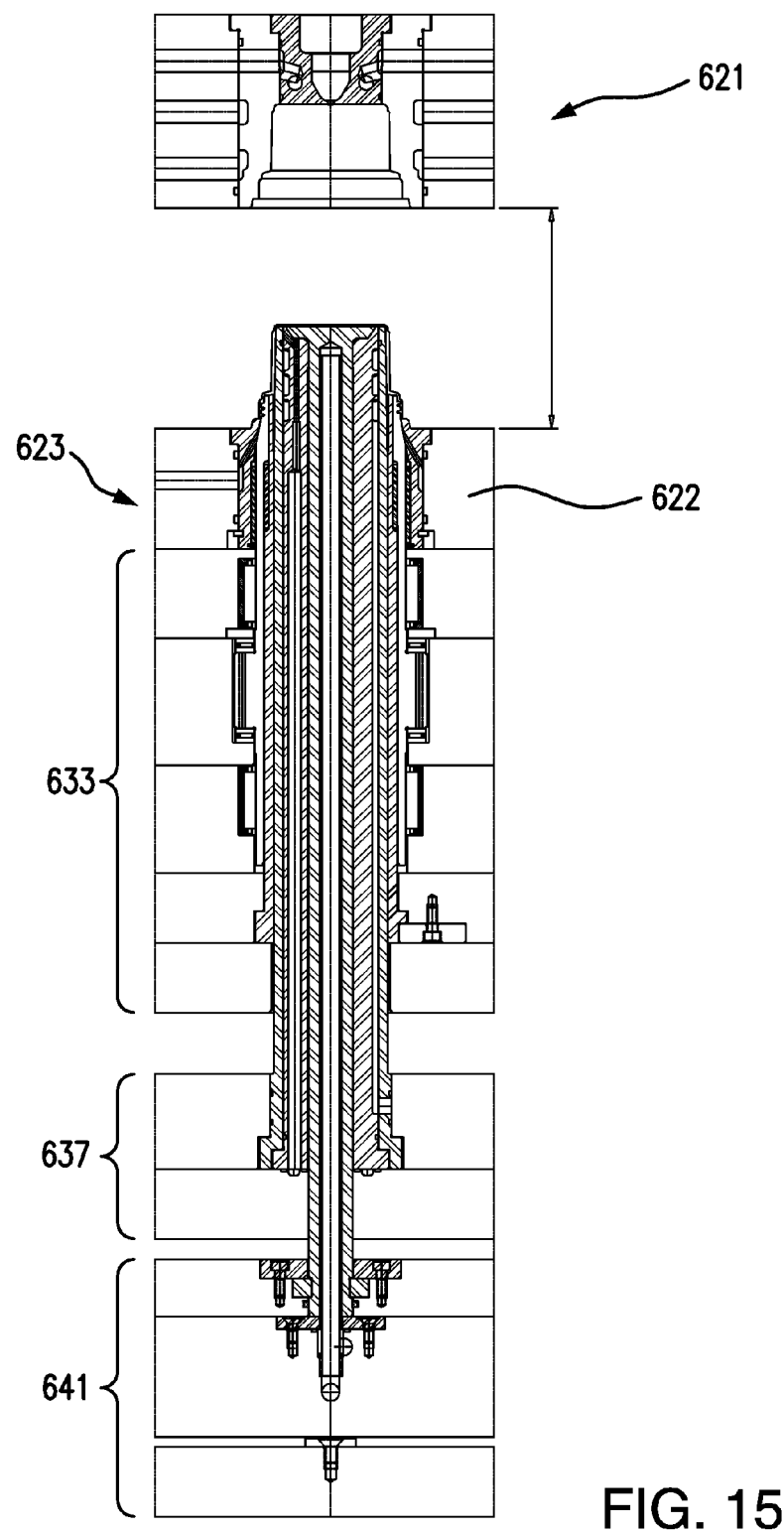
FIG. 15 is a sectional view of a mold assembly along the central axis of the mold cavity in a second condition.

FIG. 15 shows a first stage of mold release after molding. The main part line has opened up by shifting (arrow shown) the cavity unit 621 axially away from the remaining units causing its surfaces to disengage from the mating surfaces of the molded cap (the top of the web, the exterior of the upper sidewall, the top of the flange and the exterior of the threaded outer sidewall).

Figure 16:
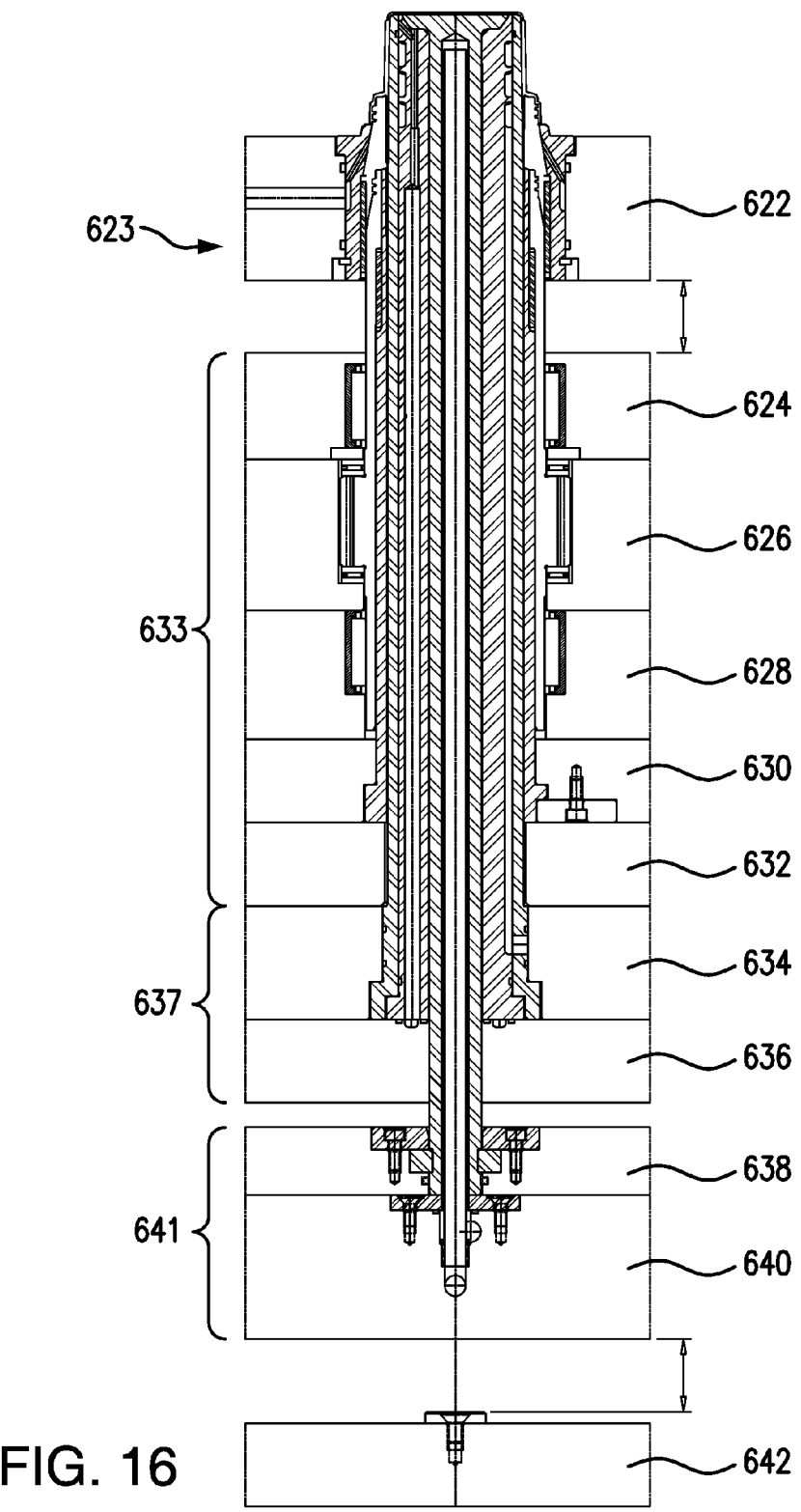
FIG. 16 is a sectional view of a mold assembly along the central axis of the mold cavity in a third condition.

FIG. 16 reflects the culmination of several actuations which may be mechanically interlocked/synchronized. The synchronized actuation comprises an unscrewing rotation of the threaded core 720 and axial shifts (arrows shown) of several of the units. The bottom clamp plate 642 and the stationary unit 633 remain stationary in this example. In other examples, these may move and the movements otherwise described may be viewed as relative. The two ejector plate units 637 and 641 and the stripper unit 623 all move together as a unit away from the bottom clamp plate. This action and the synchronized unscrewing of the rotating core 720 disengage the cores 700 and 720 from the molded part and thus begins the stripping process.

At the end of this stage, the top ejector plate unit 637 has closed the gap with the support plate 632 and bottomed there against. The original gap between the top ejector plate and bottom ejector retaining plate remains.

Figure 17:
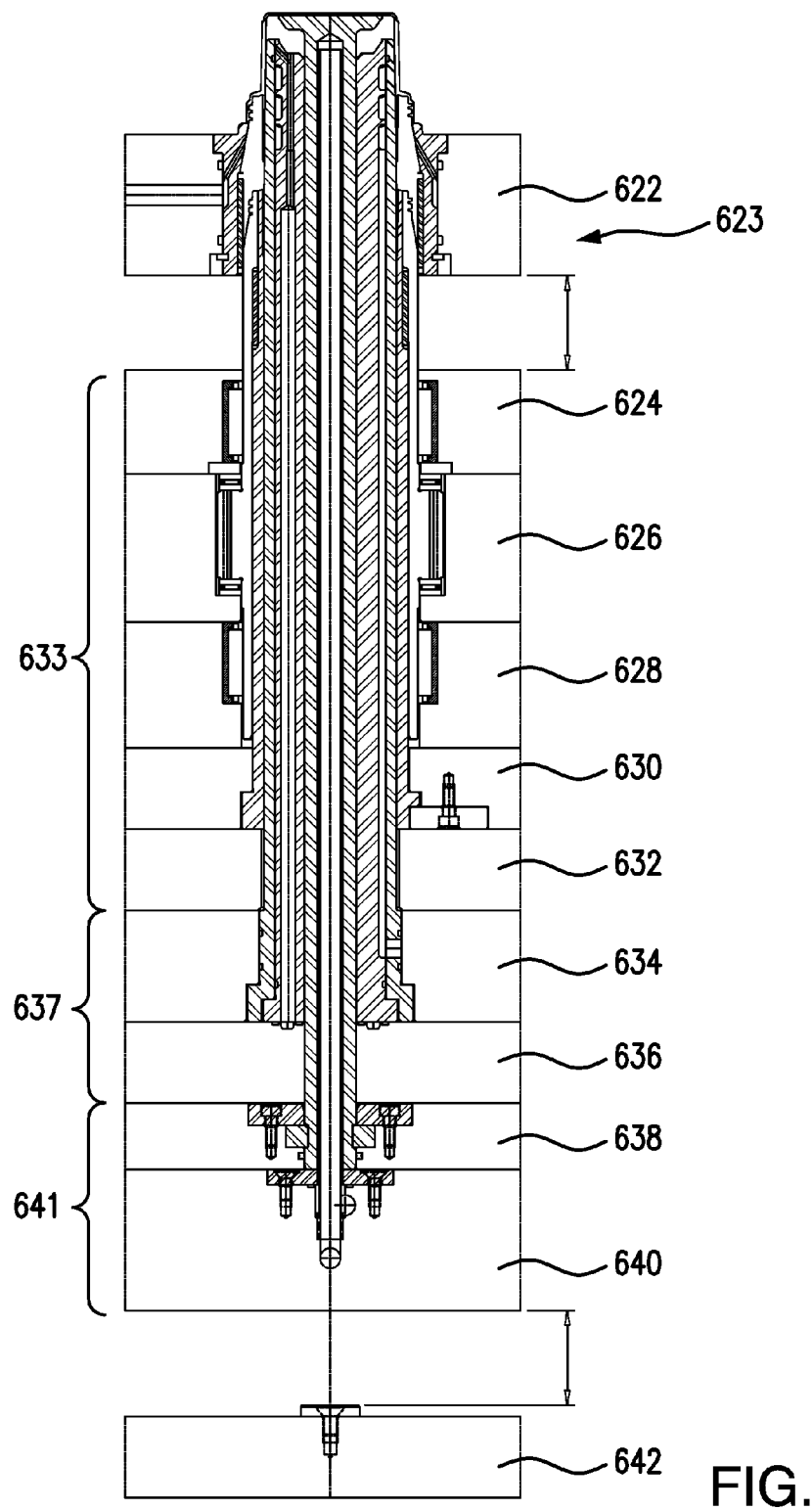
FIG. 17 is a sectional view of a mold assembly along the central axis of the mold cavity in a fourth condition.

The next step shown completed in FIG. 17 involves shifting the bottom ejector plate unit 641 further to close that gap. This shift is done as a unit including the stripper unit.

With the top ejector unit 637 not moving during this transition, the core assembly 680 does not move and thus there is a slight shift of the cap relative to the core assembly 680 with the outer diameter surface of the core assembly 680 slightly sliding down the cap as the head of the ejector pushes on the underside of the cap web and the stripper pushes on the lower rim of the threaded sidewall. During this entire stage, air may be introduced through the passageway 692, 693, 694 to break vacuum under the cap web. For example, tolerance between the OD of core member 682 and the ID of core member 684 is sufficient to allow an initial leakage flow to the cap underside from passageway branch 694 while the head underside may seal the branch 693. That initial leakage flow may pass between the cap sidewall/dosing tube ID surface and the core member 684 OD surface to break adhesion and facilitate subsequent advance of the poppet. As soon as the poppet advances, flow is also permitted though branch 693. The poppet advance shifts the cap relative to the core 680 during transition from the FIG. 16 condition to the FIG. 17 condition.

Thus, at the end of this stage, the gap between the bottom ejector retaining plate and the top ejector plate has closed.

Figure 18:
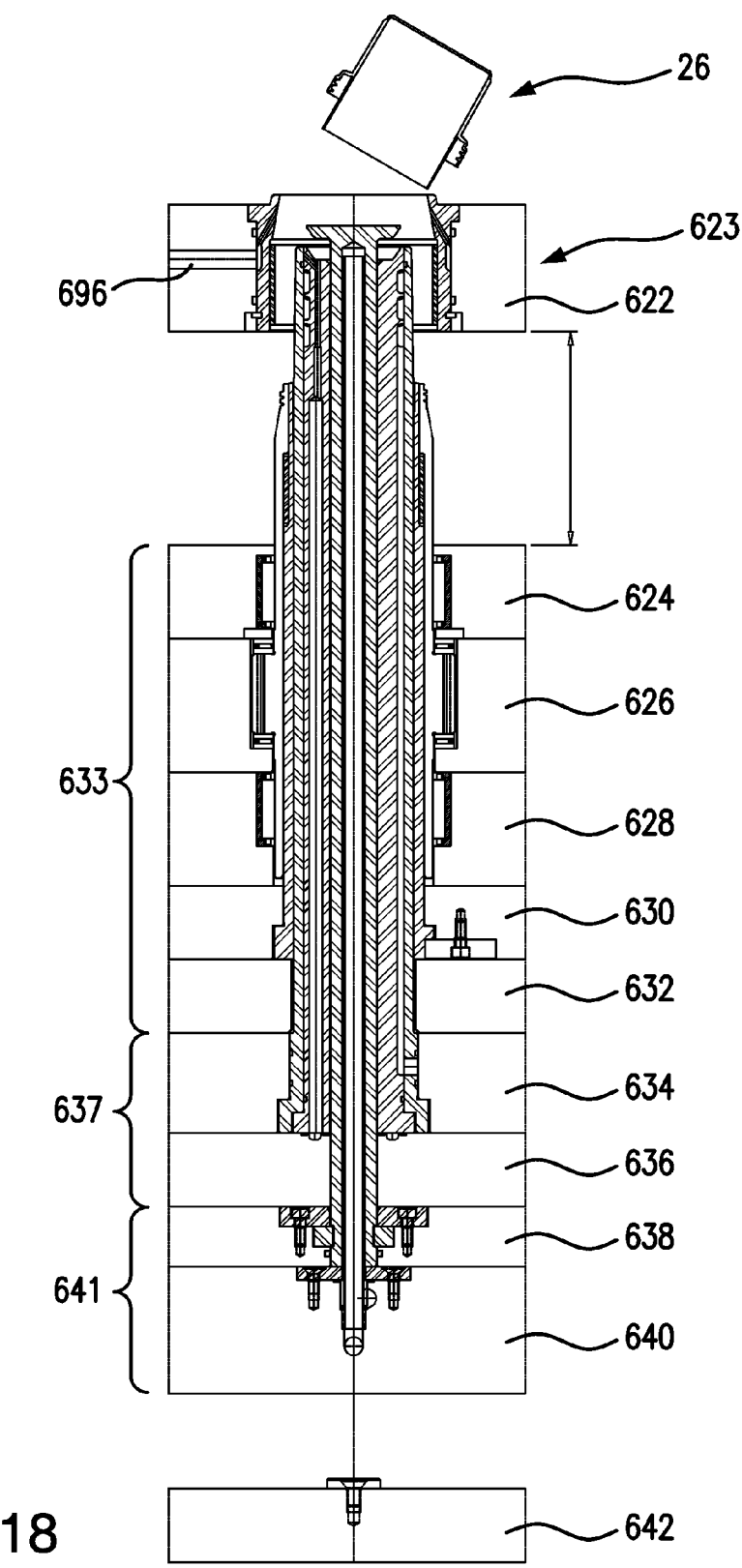
FIG. 18 is a sectional view of a mold assembly along the central axis of the mold cavity in a fifth condition.

FIG. 18 shows the final stage of ejection as the stripper unit extends further outward relative to the other units. This extension movement is coupled with the action of air pressure introduced in the air passageways 696, 698, in addition to the air already flowing through passageways 692, 693 694, and thus filling the spaces between the threaded sidewall and dosing tube and adjacent the underside of the ejector head.

The air pressure may cause final ejection after the stripper has sufficiently advanced the cap from the core 680.

Figure 14D:
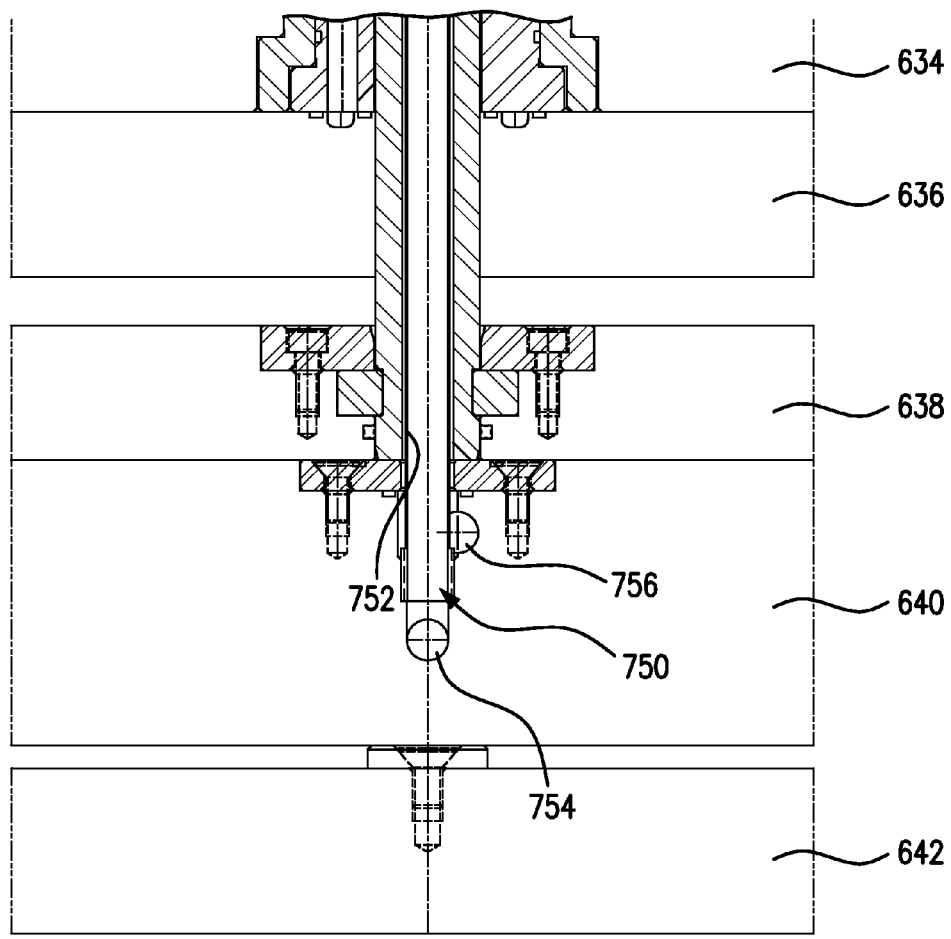
FIG. 14D is an enlarged view of an end opposite the cavity end of the mold assembly.

Additionally, during the stripping/ejection process, the air pressure prevents a variety of deformations of the cap. For example, in absence of air, friction between the core 680 and the inner diameter surface of the upper sidewall and dosing tube will cause deformation of the flange and may cause elongation and other deformation of the dosing tube. In the particular illustrated cap configuration this may provide a more precise/consistent molding of the flange which is relevant as a sealing surface. Nevertheless, the basic apparatus and methods may be used with other caps. These may include caps where the ID sidewall thread is intended to engage a spout fitment rather than a bottle body. These may also include caps (flanged or not) with externally threaded dosing tubes instead of internally threaded outer sidewalls, FIG. 14D shows a bubbler tube 750 extending axially within a bore 752 of the ejector. A bubbler passageway extends from an inlet 754 in the bottom ejector, up through the tube 750, then turning back through the annulus between tube and bore and then out an outlet 756 in the bottom plate. The bubbler carries a flow of water and serves to cool the head 674.

Figure 19:
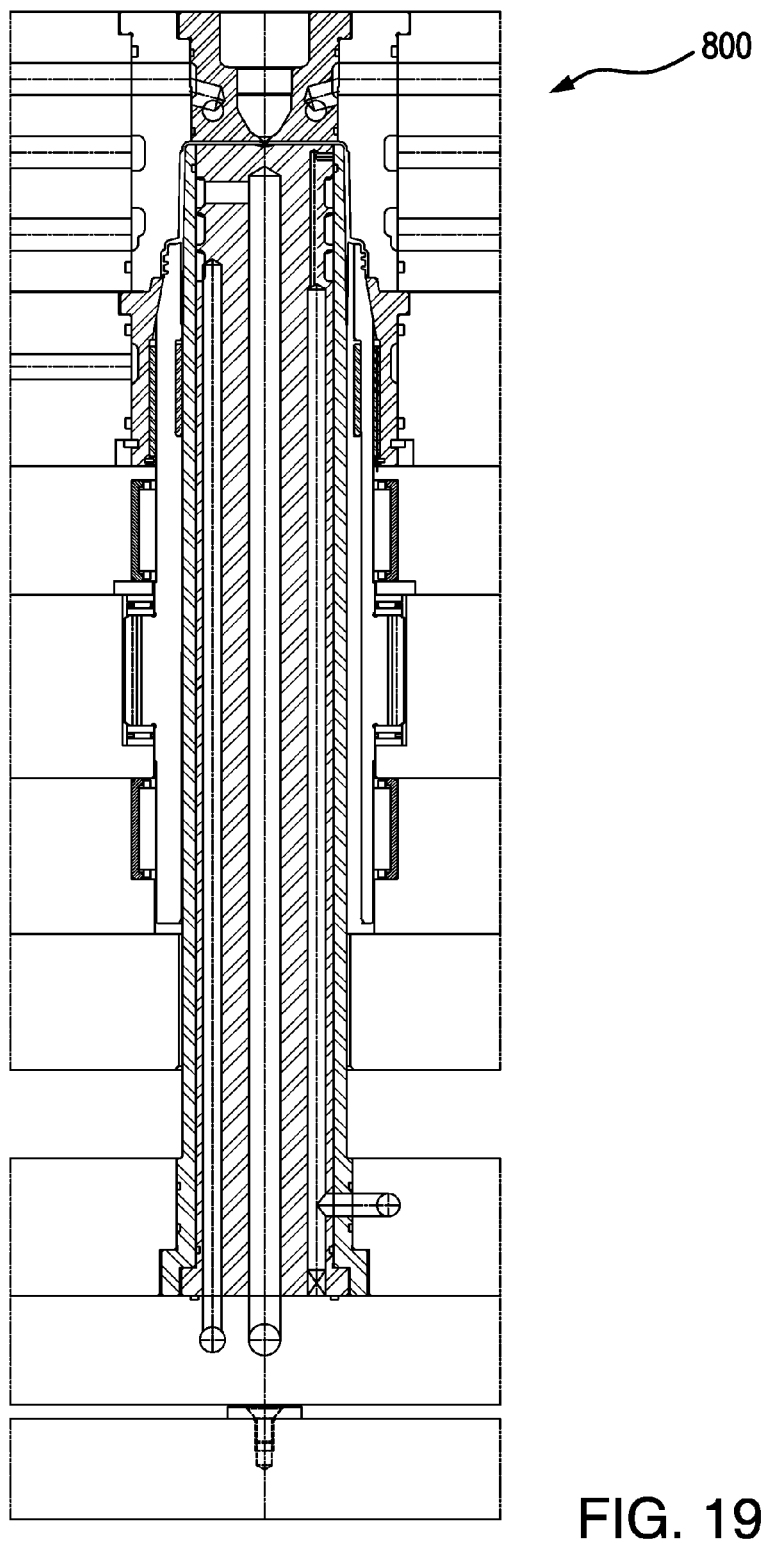
FIG. 19 is a sectional view of a baseline mold assembly along a central axis of a mold cavity in a closed/molding condition.

FIG. 19 is a central axial sectional view of a baseline mold assembly 800. Although configured to mold the inventive cap, the general core layout is considered prior art. As noted above, the water jacket inlet and outlet passageways are shown whereas the FIG. 14 has one of said passageways below or above the cut plane.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments of the present invention have been described. Nevertheless, it will be understood that various modifications may be made without departing from the spirit and scope of the invention. For example, when implemented in the reengineering of an existing container configuration, details of the existing configuration may influence or dictate details of any particular implementation. When implemented using particular molding equipment, details of that equipment may also influence details of any particular implementation. Accordingly, other embodiments are within the scope of the following claims.

What is claimed is:

1. A method for manufacturing a cap having:
an upper sidewall;
an upper web at the upper end of the upper sidewall;
a dosing tube; and
a flange protruding radially from a junction of the upper sidewall and the dosing tube,
wherein the method comprises:
  molding the cap in a cavity of a mold, the cavity formed by a plurality of members; and
  releasing the cap from the mold, including:
    a stage wherein there is a relative axial shift of a first member of said plurality of members forming a portion of the mold cavity along an inner diameter surface of the upper sidewall and dosing tube relative to a second member of said plurality of members forming a portion of the mold cavity along an underside of the upper web,
wherein:
the plurality of members includes a thread core;
the cap has a thread and said stage comprises said relative axial shift synchronized with an unscrewing of the thread core; and
during said unscrewing, pressurized air is introduced through a passageway in the second member.

2. The method of claim 1 wherein:
said cap has an outer sidewall depending from the flange and said thread is an internal thread on the cap outer sidewall.

3. The method of claim 1 wherein:
the plurality of members includes a cavity plate unit; and
said stage is preceded by a disengagement of the cavity plate unit, the cavity plate unit forming portions of the mold cavity along a top of the web and an outer diameter surface of the upper sidewall.

4. The method of claim 1 further comprising:
injection molding the cap on the cavity.

5. The method of claim 1 wherein:
the plurality of members include a thread core mounted for rotation relative to the second member and for axial movement with the second member as a unit; and
the relative axial shift is synchronized with rotation of the thread core relative to the second member.

6. The method of claim 1 wherein:
the first member has a poppet form with a head and a stem, the head at least partially recessed in a compartment in the second member in a first condition and extendable proud of a rim of the second member in a second condition; and
the relative axial shift comprises extending the head toward the second condition.

7. The method of claim 6 wherein:
the passageway has an outlet to said compartment; and
during the relative axial shift, air is passed through the passageway out the outlet.

8. The method of claim 7 wherein:
the second member air passageway has a second outlet along said rim; and
during the relative axial shift, air is passed through the passageway out the second outlet.

9. The method of claim 1 wherein:
a stripper unit has a portion forming a lower rim of an outer sidewall portion of the cavity; and
the relative shift includes moving the stripper unit with the second member as a unit.

10. The method of claim 7 wherein:
a second air passageway is in the stripper unit; and
a further stage extends the stripper unit relative to the second member and comprises introducing air into the second air passageway.

11. A method for manufacturing a cap having:
an upper sidewall;
an upper web at the upper end of the upper sidewall;
a dosing tube; and
a flange protruding radially from a junction of the upper sidewall and the dosing tube,
wherein the method comprises:
  molding the cap in a cavity of a mold, the cavity formed by a plurality of members; and
  releasing the cap from the mold, including:
    a stage wherein there is a relative axial shift of a first member of said plurality of members forming a portion of the mold cavity along an inner diameter surface of the upper sidewall and dosing tube relative to a second member of said plurality of members forming a portion of the mold cavity along an underside of the upper web,
wherein:
the plurality of members include a stripper unit having a portion forming a lower rim of an outer sidewall portion of the cavity; and
the relative shift includes moving the stripper unit with the second member as a unit.

* * * * *